March 5, 1963  A. H. FREEMAN  3,079,735
LINK AND FLIGHT BAR ASSEMBLY
Filed March 24, 1961  2 Sheets-Sheet 1

INVENTOR.
Ardee Horace Freeman

March 5, 1963 A. H. FREEMAN 3,079,735
LINK AND FLIGHT BAR ASSEMBLY
Filed March 24, 1961 2 Sheets-Sheet 2

INVENTOR.
Ardee Horace Freeman
BY Ooms, McDougall,
Williams and Hersh
Att'ys

United States Patent Office 3,079,735
Patented Mar. 5, 1963

3,079,735
LINK AND FLIGHT BAR ASSEMBLY
Ardee Horace Freeman, Granger, Ind., assignor to Bell Intercontinental Corporation, Mishawaka, Ind., a corporation of Delaware
Filed Mar. 24, 1961, Ser. No. 98,207
6 Claims. (Cl. 51—163)

This invention relates to a machine for cleaning the surfaces of articles, such as metal castings and the like, by throwing abrasives onto the surfaces of the articles as they are tumbled about in the path of the abrasives. It relates more particularly to a means for conveying the articles into and out of the machine and for providing for a continuous tumbling action within the machine during operation.

The invention is related to a centrifugal blasing machine of the type described in the Peik Patent No. 2,104,055. Briefly described, such machines comprise a housing completely enclosing a conveying means formed of a plurality of flight bars which extend crosswise between endless chains for travel about a predetermined path with the flight bars in overlapping relation at their edges to form an endless, horizontally disposed belt on which the work or articles to be cleaned are supported. The upper flight of the belt travels between a driving sprocket and a guide roller spaced forwardly and below the sprocket. Between the rollers and sprockets there is provided a pair of spaced circular drums mounted for rotational movement about a horizontal axis between the sprockets and rollers with a peripheral portion of the drum extending rearwardly and below the sprocket and rearwardly and below the roller whereby the upper flight of the belt travels horizontally and in a downward direction beyond the roller and upwardly in a forwardly direction in advance of the sprocket. As a result, when the belt travels in the direction from the roller to the sprocket, the work will be carried up the belt and be caused to tumble forwardly continuously onto the underlying work. The endless belt doubles back beneath the upper flight for travel about the forward roller and about a rearward roller to the sprocket.

The area between the drums is substantially completely enclosed by the belt and other portions of the housing including a doorway through which access may be had to the top flight of the conveyor belt for loading and unloading the machine. One or more wheels for throwing abrasive particles into the housing and onto the work are mounted on the housing with suitable attachments for feeding and driving the units. Detailed description thereof will not be made since they form no part of this invention and are adequately described in the forementioned issued patent.

One of the difficulties which has been encountered in constructions of the type heretofore employed is the arrangement as between the flight bars and the chains whereby a spaced relationship is caused to develop between the bars as they are advanced with the chains about a radius, as when traveling over the front roller or over the driving sprocket. The existence of an opening between the flight bars enables entrance of the work into the space between flight bars. As a result, the work becomes clamped between the bars and is carried with the belt until jammed against other portions of the machine with consequent break-down or else the work prevents the flight bars from closing with resultant damage or break-down of the flight bars. Whatever the result, such damage often occurs as requires shut-down of the machine for repair or replacement of parts. This is most undesirable not only from the standpoint of cost in materials and labor, but because it takes the machine out of operation with the resultant pile-up of production schedules.

An improved device eliminating many of the above disadvantages has been disclosed in a patent issued to Kenneth H. Barnes, Patent No. 2,909,012. In this patent, there is described a tumbling mill or centrifugal blasting machine which maintains the flight bars of the conveyor substantially in continuous contacting relationship one with the other to provide a continuous conveyor which is free of openings between the flight bars during travel over curvilnear as well as over linear paths.

This improvement provides a suitable tight assembly when considering conventional blasting operations. However, it was soon found that some very small elements and components with small projections thereon were apt to catch between the flight bars. Thus, for example, very thin side bars employed in the manufacture of light chain, for instance, bicycle chain, would jam even in an assembly such as described in the apparatus of Patent No. 2,909,012.

It is, therefore, an object of this invention to provide a continuous conveyor which is free of openings between the flight bars during travel over curvilinear as well as along linear paths, and which has improved means for conveying the work in tumbling action within the path of the abrasive particles thrown by the machine.

It is a further object of this invention to provide an apparatus capable of achieving the above objects even when it is desired to clean very small elements or components with thin projections thereon.

These and other objects of this invention will appear hereinafter, and for purposes of illustration, but not of limitation, specific examples of this invention are shown in the accompanying drawings in which—

Figure 1:
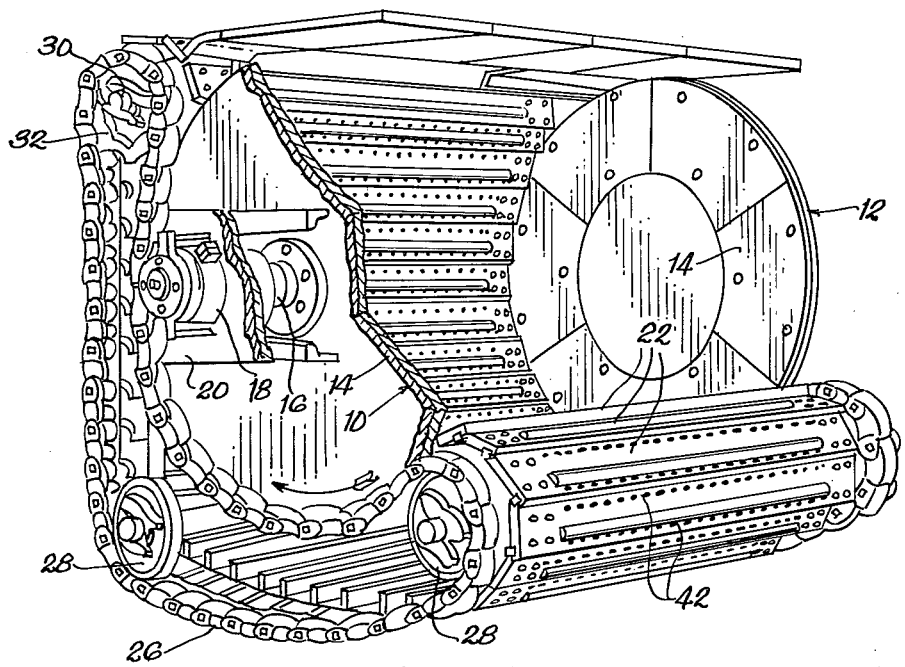
FIGURE 1 is a perspective elevational view of a fragmentary portion of the machine illustrating the features of this invention.

In the drawings, illustration is made of the conveyor portion of the machine embodying the features of this invention comprising a pair of spaced drums 10 and 12 having liner plates 14 secured onto the inner faces thereof for purposes of protecting the drums against wear by the abrasive materials thrown at high velocity into the space between the drums. The drums are mounted on shafts 16 which are secured at their ends in journals 18 fixed to the frame plates 20 of the machine for enabling rotational movement of the drums about a horizontal axis.

A plurality of flight bars in the form of elongate flat plates 22, dimensioned to have a length corresponding to the spaced relation between the linings 14, are fixed at their lateral edges upon pads integral with the chain links 26.

For a more detailed explanation of a preferred arrangement of the flight bars 22 and chain links 26, reference is made to the aforementioned U.S. Patent No. 2,909,012, the disclosure of which is incorporated herein by reference.

The conveyor portion of the apparatus of this invention further includes rollers 28 for guiding the travel of the links 26 and the bars 22. Sprocket 30 is adapted to drive the chains and attached bars by means of lugs 32 which interfit with depressed portions in the links 26.

Figure 2:
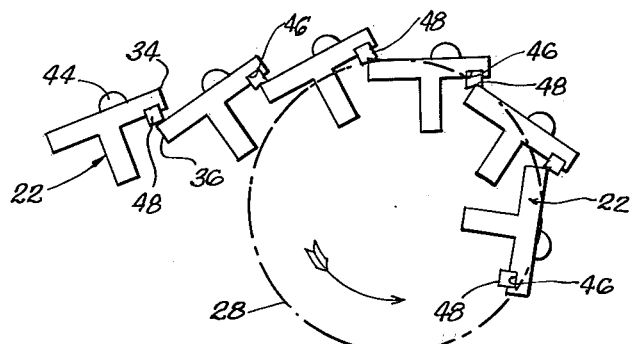
FIGURE 2 is a schematic view showing the arrangement of flight bars during travel through the various paths in which they are carried in the machine.

FIGURE 2 illustrates the action of the plates 22 as they pass over the roller 28, the bed formed by the plates 22 moving in the direction of the arrow shown in FIGURE 1. It is apparent that the overlapping of the adjacent edges 34 and 36 of the various plates 22 will provide a tight assembly, the passage of objects between the plates 22 being effectively prevented, as will hereinafter appear.

Figure 3:
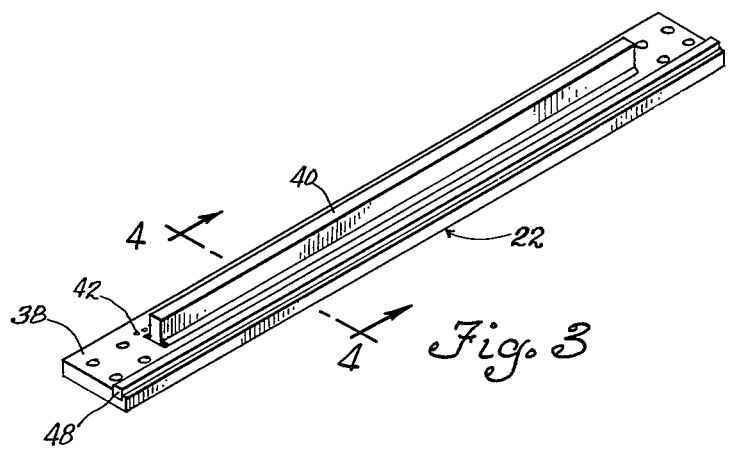
FIGURE 3 is a perspective view of a flight bar characterized by the novel features of this invention.
Figure 4:
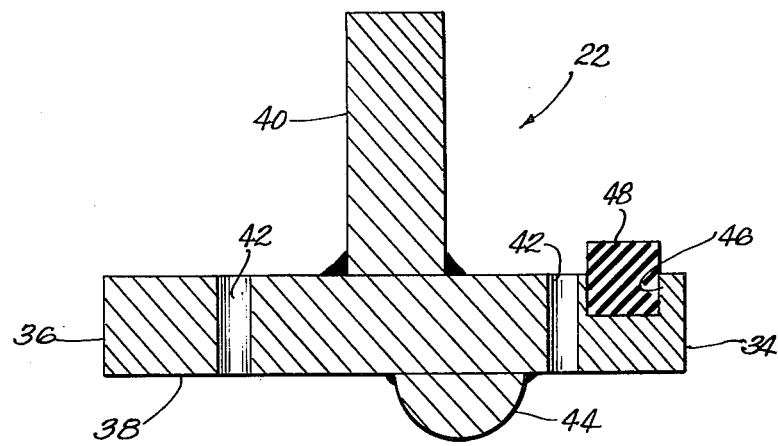
FIGURE 4 is a sectional view of the flight bar of this invention taken about the line 4—4 of FIGURE 3.

In order to prevent passage of even the smallest objects, the assembly of FIGURES 1 and 2 is provided with flight bars 22 of the type shown in FIGURES 3 and 4. These bars comprise elongate flat portions 38 having a strengthening rib 40 welded thereto to form a generally T-shaped member. A plurality of openings 42 are provided for the passage of abrasive into a receptacle below the upped flight in the construction shown in FIGURE 1.

A work holding member 44 is formed on the upper side of the plate 38 and functions to aid in carrying the work over the roller 28 into the cleaning area. The holding member 44 also serves to improve the tumbling action of the work. Since the member 44 is in the form of a half-round, the work will easily tumble within the cleaning area in a desired fashion.

The flight bar 22 is further characterized by the formation of an elongate slot 46 which extends the length of the bar 22. There is secured within this slot a flexible sealing member 48.

Again considering FIGURE 2, it will be apparent that the novel flight bars enable the provision of an extremely tight assembly, there being no opportunity for even the smallest objects to penetrate the seal afforded by the flexible member 48. There is a natural tendency for the overlapping adjacent edges 34 and 36 to press together and it is apparent that the edge 36 will penetrate approximately along the center of the flexible member 48. This is particularly true when assembly of the flight bars is effected in the manner set forth in the aforementioned Barnes patent. This natural tendency for pressing when combined with the resiliency of the member 48 affords a highly effective seal.

In a preferred embodiment of this invention, the rubber member 48 is cemented in the opening 46. However, any material having the general characteristics of rubber is contemplated and any means of securing this flexible member is likewise within the scope of this invention.

In operation, the driving motor is operated to turn the sprocket 32. The lugs of the sprocket which are enmeshed with the undercuts in the links cause the link chain to travel in the one direction about the sprocket 32 and the rollers 28. The flight bars move with the links to provide a continuously traveling, substantially continuous support on which the work is carried.

When the flight bars are advanced in the direction of the arrow in FIGURE 1, the work will be carried into the machine and tumbled continuously one over another. When advanced in the reverse direction, the flight bars will carry the work over the hump about the roller 32 for delivery into a waiting receptacle. The abrasive particles thrown onto the tumbling work will sift downwardly gravitationally and fall through the plurality of openings 42 provided in the flight bars, first through the upper flight and then through the underlying return flgt into a receptacle therebeneath.

It is apparent that the above assembly provides an improved flight bar apparatus which enables cleaning of even the smallest objects without jamming of the assembly.

The improvements herein disclosed thus enlarge the capabilities of machines employed for cleaning the surfaces of metallic objects while at the same time decreasing the likelihood of high maintenance costs.

It will be understood that various modifications may be made in the above disclosed flight bar assembly without departing from the spirit of this invention, particularly as defined in the following claims.

I claim:

1. In a machine of the type described having a pair of laterally spaced rotatable drums, rollers spaced outwardly of said rotatable drums, one of which comprises a driving sprocket and a pair of endless link chains formed of a plurality of links pivotally connected at their forward ends to the rearward end portions of links in advance thereof to provide a front and back articulation point for each link, said link chains being operable about the sprocket and rollers located outwardly of said drums, the improvement comprising flight bars extending crosswise between the links of the spaced link chains and connected at their ends thereto for travel therewith, the flight bars being dimensioned to have a length corresponding to the spaced rollers between the drums for operation therebetween and dimensioned to have a width greater than the distance between the articulation points of the attached chain links so that the flight bars overlap one another at their edges, said flight bars having an elongate flexible sealing member extending longitudinally thereof, said member being located on said bars near the edge thereof which is overlapped by the edge of an adjacent flight bar whereby a flexible seal is effected between adjacent bars.

2. A machine of the type described in claim 1, wherein said sealing member is composed of rubber.

3. An improved flight bar for use in a machine of the type described, said flight bar comprising an elongate flat plate, an opening extending longitudinally of said plate along an edge on the underside thereof, an elongate flexible sealing member being secured within said opening, and projecting beyond the surface of said underside.

4. A flight bar according to claim 3, wherein said flight bar includes an elongate stiffening rib extending perpendicularly from its underside and an elongate work holding means etxending longitudinally of said flight bar secured to the upper side of said bar.

5. A flight bar according to claim 3, wherein said sealing member is formed of rubber and is cemented within said opening.

6. A machine according to claim 1 wherein said sealing member is located on said flight bars whereby the said edge of adjacent bars will penetrate approximately along the center of said sealing member when said bars are pressed together.

References Cited in the file of this patent
UNITED STATES PATENTS

| | | |
|---|---|---|
| 1,435,600 | Graham | Nov. 14, 1922 |
| 1,656,528 | Millard | Jan. 17, 1928 |
| 2,563,084 | Turnbull | Aug. 7, 1951 |
| 2,716,310 | Moore | Aug. 20, 1955 |
| 2,909,012 | Barnes | Oct. 20, 1959 |